(12) United States Patent
Narushima

(10) Patent No.: US 8,635,655 B2
(45) Date of Patent: Jan. 21, 2014

(54) INPUT SWITCHING APPARATUS AND INPUT SWITCHING METHOD OF AUDIO/VIDEO SIGNAL, AND AUDIO/VIDEO SYSTEM

(75) Inventor: Masaki Narushima, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 0 days.

(21) Appl. No.: 13/618,070

(22) Filed: Sep. 14, 2012

(65) Prior Publication Data

US 2013/0086622 A1    Apr. 4, 2013

(30) Foreign Application Priority Data

Sep. 30, 2011    (JP) .................. 2011-218358

(51) Int. Cl.
*H04N 7/18*    (2006.01)
*G06F 3/00*    (2006.01)
*G06F 13/362*    (2006.01)

(52) U.S. Cl.
USPC .................. 725/80; 710/37; 710/38; 710/113

(58) Field of Classification Search
None
See application file for complete search history.

(56) References Cited

U.S. PATENT DOCUMENTS

2009/0281643 A1    11/2009    Higuchi et al.
2009/0282437 A1*   11/2009    Malec et al. .................... 725/40
2009/0284536 A1*   11/2009    Yoshida ........................ 345/520

FOREIGN PATENT DOCUMENTS

| JP | 2008-54300 A   | 3/2008  |
| JP | 2008-104175 A  | 5/2008  |
| JP | 2008-205562 A  | 9/2008  |
| JP | 2009-260679    | 11/2009 |
| JP | 2009-284374 A  | 12/2009 |
| JP | 2011-23946 A   | 2/2011  |
| JP | 2011-146778 A  | 7/2011  |

OTHER PUBLICATIONS

Japanese Office Action with English translation thereof dated Aug. 20, 2013 {Six (6) pages}.

* cited by examiner

*Primary Examiner* — Jason J Chung
*Assistant Examiner* — William J Kim
(74) *Attorney, Agent, or Firm* — Crowell & Moring LLP

(57) ABSTRACT

An input switching apparatus includes a plurality of AV signal input units; a communication unit that communicates with another AV device; an input selection unit that selects one of the plurality of AV signal input units; and a selection control unit that switches selection of the input selection unit in accordance with a switching request message for requesting switching of the input selection unit from an origin position to a destination position when the communication unit receives the switching request message. While the input position holding mode is activated, the selection control unit holds the selection of the input selection unit even when the switching request message is received, and transmits a message for causing another device to perform a switching from the destination position to the origin position.

14 Claims, 12 Drawing Sheets

FIG.3

| Address | Device |
|---|---|
| 0 | TV |
| 1 | Recording Device 1 |
| 2 | Recording Device 2 |
| 3 | Tuner 1 |
| 4 | Playback Device 1 |
| 5 | AudioSystem |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | SpecificUse |
| 15 | Unregistered (as initiator address) |
| 15 | Broadcast (as destination address) |

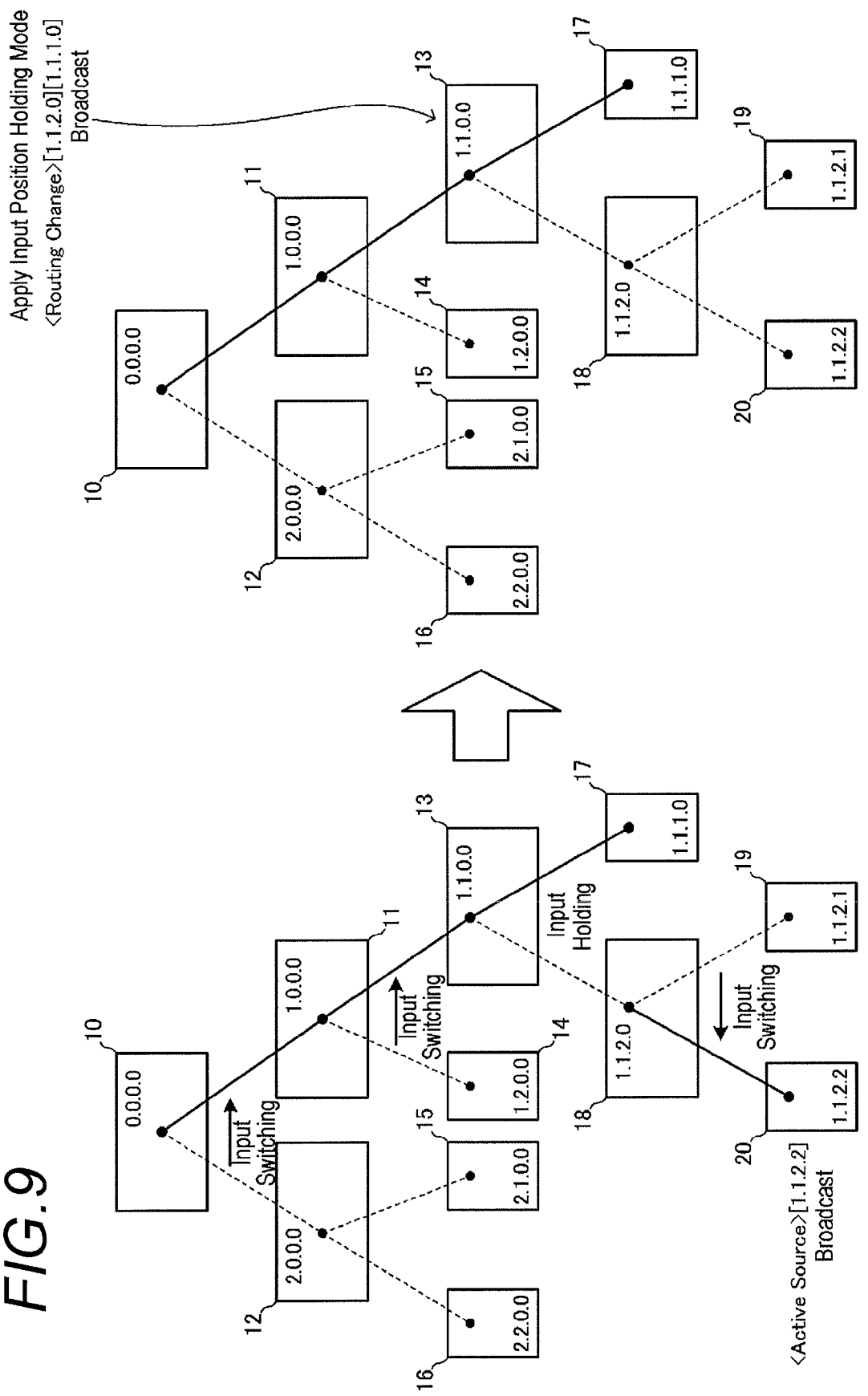

INPUT SWITCHING APPARATUS AND INPUT SWITCHING METHOD OF AUDIO/VIDEO SIGNAL, AND AUDIO/VIDEO SYSTEM

CROSS-REFERENCE TO RELATED APPLICATIONS

The present application is based on and claims the benefit of Japanese patent application No. JP 2011-218358, filed on Sep. 30, 2011, the contents of which are incorporated by reference in its entirety.

BACKGROUND OF THE INVENTION

1. Technical Field

The invention relates to an input switching apparatus and an input switching method of an audio/video signal for selecting one of a plurality of audio/video signals and reproducing or outputting the same from an output unit, and an audio/video system.

2. Background Art

As a technology of transmitting an audio/video signal (AV signal) between a source device and a sink device in a digital format, an HDMI (High-Definition Multimedia Interface) has been put to practical use. As an optional function of the HDMI, there is a CEC (Consumer Electronics Control) function for interconnection operation between home electric appliances. An interconnection operation function using the CED such as one-touch play, remote control pass-through and system standby has been implemented.

The HDMI has a variety of lines of transmitting and receiving a control signal, in addition to a TMDS (Transition Minimized Differential Signaling) line of transmitting an AV stream signal. The lines include a CEC line that transmits a CEC message. In an AV device having a plurality of HDMI input terminals, the TMDS line becomes active only in a selected path and transmits an AV signal in one direction from a source device to a sink device. However, the CEC line is connected to all devices including a device that is not selected, in a tree structure, and the devices interactively perform communication while distinguishing the devices each other by address information attached to the CEC message. In the meantime, an AV device having a plurality of HDMI input terminals and having a function of selecting one of the HDMI input terminals is referred to as a CEC switch. In an AV system, an AV amplifier, a television receiver and the like have the function of the CEC switch.

A function of the CEC is described with reference to FIG. 1. FIG. 1 shows an example of an AV system including a CEC switch. An AV amplifier 500 having a switching function is connected with a television receiver 501 serving as a sink device, and with a DVD player 502 and a set-top box (STB) 503 serving as source devices. The AV amplifier 500 has a function of selecting one of a plurality of inputs (in this example, the DVD player 502 and the set-top box 503) and outputting the same to the television receiver 501 and corresponds to a CEC switch.

In the AV system having the above connection topology, when a play switch of the DVD player 502 becomes on, the DVD player 502 outputs a CEC message (Active Source message), so that the AV amplifier 500 switches the input to the DVD player 502. Also, when a power supply of the set-top box 503 becomes on, the CEC message (Active Source message) is output from the set-top box 503, so that the AV amplifier 500 switches the input to the set-top box 503. In the meantime, JP-A-2008-054300 discloses a technology of such HDMI connection.

SUMMARY OF THE INVENTION

In the example of FIG. 1, when a user reproduces a disc with the DVD player 502 and watches the content on television receiver 501, the power supply of the set-top box 503 may be on spontaneously. For example, a timer function for recording may operate. In this case, since the set-top box 503 outputs an Active Source message as the power supply becomes on, the AV amplifier 500 switches the input to the set-top box 503 even though the user is watching the content of the DVD player 502.

An object of the invention is to provide an input switching apparatus of an audio/video signal, an input switching method and an audio/video system capable of holding a transmission path of an AV signal that a user desires.

A first aspect of the invention provides an input switching apparatus of an audio/video signal, the apparatus including: a plurality of audio/video signal input units to which audio/video signals are input; a communication unit that communicates with another audio/video device; an input selection unit that selects one of the plurality of audio/video signal input units to thus receive the audio/video signal of the selected audio/video signal input unit; and a selection control unit that switches selection of the input selection unit in accordance with a switching request message for requesting switching of the input selection unit from an origin position to a destination position when the communication unit receives the switching request message, wherein the selection control unit is configured to activate an input position holding mode, and while the input position holding mode is activated, the selection control unit holds the selection of the input selection unit even when the communication unit receives the switching request message for requesting switching of the input selection unit from the origin position to the destination position, and transmits a message for causing another device to perform a switching from the destination position to the origin position through the communication unit.

A second aspect of the invention provides an input switching apparatus of an audio/video signal, the apparatus including: an audio/video signal input unit to which an audio/video signal is input from an outside; an audio/video signal generation unit that generates an audio/video signal; a communication unit that communicates with another audio/video device; an input selection unit that selects one of the audio/video signal input unit and the audio/video signal generation unit to thus receive the audio/video signal of the selected one; and a selection control unit that switches selection of the input selection unit in accordance with a switching request message for requesting switching of the input selection unit from an origin position to a destination position when the communication unit receives a switching request message, wherein the selection control unit is configured to activate an input position holding mode, and while the input position holding mode is activated, the selection control unit holds the selection of the input selection unit even when the communication unit receives the switching request message for requesting switching of the input selection unit from the origin position to the destination position, and transmits a message for causing another device to perform a switching from the destination position to the origin position through the communication unit.

The input switching apparatus may be configured so that the audio/video signal input unit includes a processing unit that receives and processes a TMDS (Transition Minimized Differential Signaling) packet of an HDMI (High-Definition Multimedia Interface), and the communication unit includes a processing unit having a CEC (Consumer Electronics Control) interface of the HDMI.

The input switching apparatus may be configured so that the selection control unit activates the input position holding mode in accordance with an input position holding mode activating message received from the communication unit.

A third aspect of the invention provides an audio/video system in which a sink device, a repeater device having the input switching apparatus as defined above and a plurality of source devices are connected in a tree topology, the sink device serving as a root device of the tree topology, wherein at least the sink device among the sink device, the repeater device and the source devices issues the input position holding mode activating message.

The audio/video system may be configured so that the sink device includes a television receiver.

A fourth aspect of the invention provides an input switching method of an audio/video signal that is executed in an apparatus including a plurality of audio/video signal input units to which audio/video signals are input, a communication unit that communicates with another audio/video device and an input selection unit that selects one of the plurality of audio/video signal input units to thus receive the audio/video signal of the selected audio/video signal input unit, the method including: switching selection of the input selection unit in accordance with a switching request message from an origin position to a destination position received through the communication unit; activating an input position holding mode; and while the input position holding mode is activated, holding the selection of the input selection unit even when the switching request message for requesting switching of the input selection unit from the origin position to the destination position is received, and transmitting a message for causing another device to perform a switching from the destination position to the origin position through the communication unit.

A fifth aspect of the invention provides an input switching method of an audio/video signal that is executed in an apparatus including an audio/video signal input unit to which an audio/video signal is input from an outside, an audio/video signal generation unit that generates an audio/video signal, a communication unit that communicates with another audio/video device and an input selection unit that selects one of the audio/video signal input unit and the audio/video signal generation unit to thus received the audio/video signal of the selected one, the method including: switching selection of the input selection unit in accordance with a switching request message from an origin position to a destination position received through the communication unit; activating an input position holding mode; and while the input position holding mode is activated, holding the selection of the input selection unit even when the switching request message for requesting switching of the input selection unit from the origin position to the destination position is received, and transmitting a message for causing another device to perform a switching from the destination position to the origin position through the communication unit.

The input switching method may be configured so that the audio/video signal input unit includes a processing unit that receives and processes a TMDS (Transition Minimized Differential Signaling) packet of an HDMI (High-Definition Multimedia Interface), and the communication unit includes a processing unit having a CEC (Consumer Electronics Control) interface of the HDMI.

According to aspects of the invention, the path of the AV signal that a user wants to watch is held by the input position holding mode and the other device on the system can recognize the held path as an effective path.

BRIEF DESCRIPTION OF THE DRAWINGS

FIG. 3 shows a logical address table of a CEC.
FIG. 9 illustrates switching of the TMDS line when an Active source message is broadcasted in another aspect of the input position holding mode.

DETAILED DESCRIPTION OF THE EXEMPLARY EMBODIMENTS

[AV System]

Figure 1:
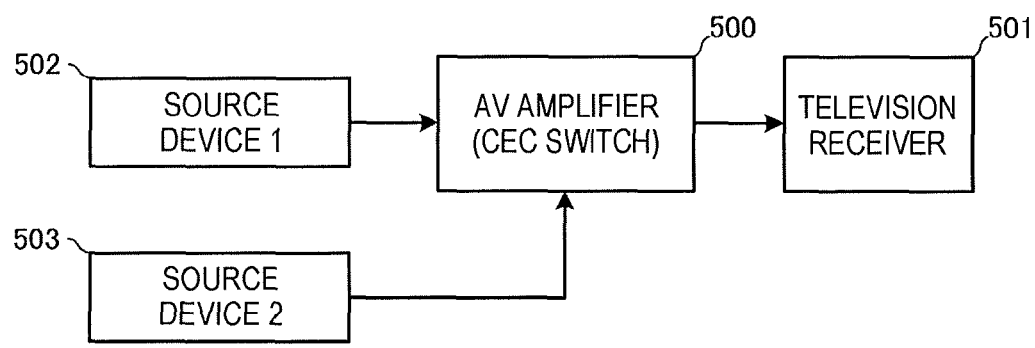
FIG. 1 shows a configuration of a general AV system.
Figure 2:
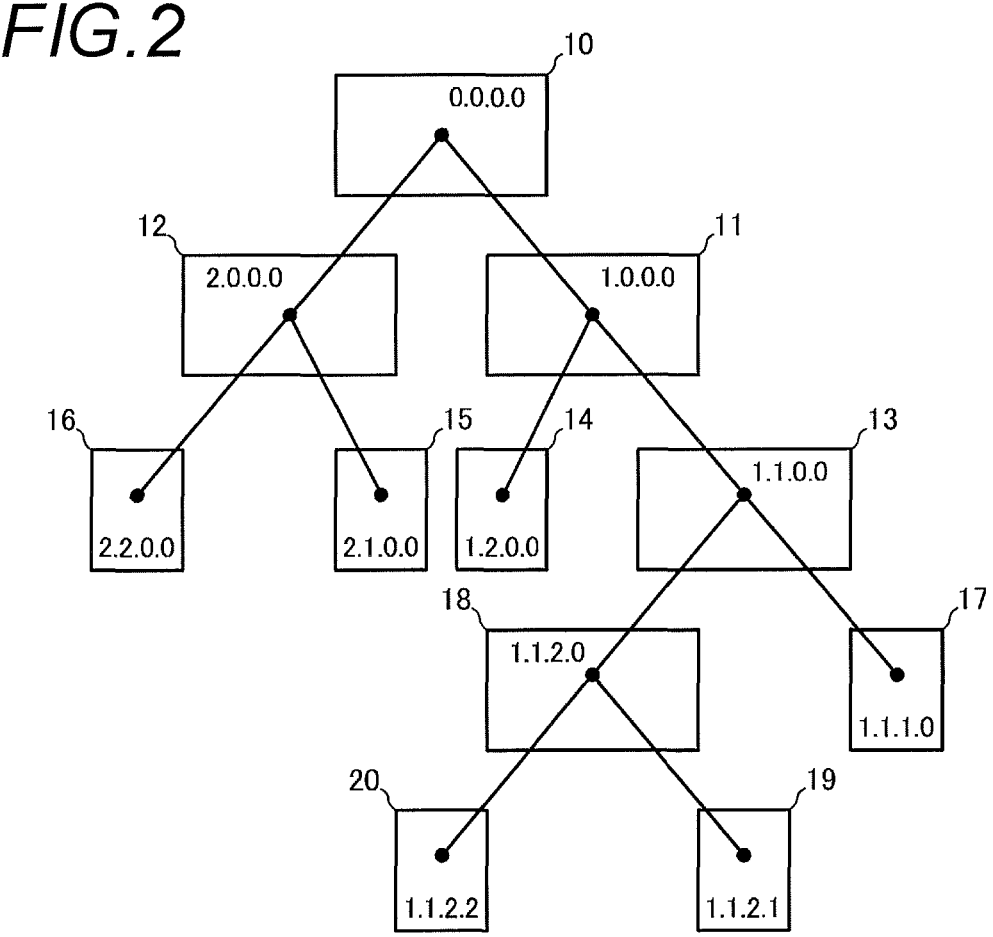
FIG. 2 shows a connection topology of an AV system according to an embodiment of the invention.

FIG. 2 shows a configuration of an AV (Audio/Video) system to which an aspect of the invention can be applied. FIG. 2 shows a connection topology, i.e., a tree structure of a plurality of devices. The eleven devices are connected in the tree structure as shown by an HDMI (High-Definition Multimedia Interface) that is an interface of connecting the AV devices. Each device on the tree is provided with a physical address by a function of the HDMI and is also provided with a logical address by a CEC (Consumer Electronics Control) function that is an option of the HDMI. The physical address is an address indicative of a position of the corresponding device in the tree and the logical address is an address indicative of a function of the device.

A device arranged at the top of the tree is a root device 10. The root device 10 is provided with a physical address 0.0.0.0. The root device 10 is a sink device because it is arranged at the most downstream side of an AV stream signal. In general, a display apparatus such as television receiver corresponds to the root device 10. The television receiver is allotted with a logical address 0, as shown in a logical address table of FIG. 3. In the below descriptions, the root device 10 is also referred to as the sink device 10 or television receiver 10.

From the root device 10, ten devices are connected at four lower layers, and the physical addresses are provided in order of layers and connections. With the HDMI standard, the hierarchical connection can be made up to four layers within the allotment range of the physical addresses from the root device 10, and for each device from the root device 10 to the third layer, up to 15 devices can be connected in parallel at the just lower layer. In order to easily know the connection topology, the root device 10 is provided with the physical address 0.0.0.0 and the physical address of A.B.C.D (ranges of each value: 0h to Fh) is provided to each device on the tree so that each digit indicates a branch (input terminal) number at each layer.

Specifically, two devices 11, 12 of the first layer connected at the lower sides (inputs 1, 2) of the root device 10 (physical address: 0.0.0.0) are allotted with the physical addresses of 1.0.0.0 and 2.0.0.0, respectively. Two devices 13, 14 of the second layer connected at the lower sides (inputs 1, 2) of the device 11 (physical address: 1.0.0.0) are allotted with the physical addresses of 1.1.0.0 and 1.2.0.0, respectively. Two devices 15, 16 of the second layer connected at the lower sides (inputs 1, 2) of the device 12 (physical address: 2.0.0.0) are allotted with the physical addresses of 2.1.0.0 and 2.2.0.0, respectively. Two devices 17, 18 of the third layer connected at the lower sides (inputs 1, 2) of the device 13 (physical address: 1.1.0.0) are allotted with the physical addresses of 1.1.1.0 and 1.1.2.0, respectively. Two devices 19, 20 of the fourth layer connected at the lower sides (inputs 1, 2) of the device 18 (physical address: 1.1.2.0) are allotted with the physical addresses of 1.1.2.1 and 1.1.2.2, respectively.

Communication lines of the HDMI include a TMDS (Transition Minimized Differential Signaling) line, a DDC (Display Data Channel) line, a CEC line and the like. The TMDS line is a line for transmitting an AV stream signal from an upstream device to a downstream device. The DDC line is used for HDCP authentication for contents-protecting the AV stream of the TMDS line and is also used to provide the physical address information from an upper side (downstream side of the TMDS signal) device of the physical address to a lower side (upstream side of the TMDS signal) device via EDID (Extended Display Identification Data). The CEC line is connected so that a bidirectional bus common to all devices tree-connected is formed, and is used to transmit a message (CEC message) for cooperatively operating a plurality of devices. While the TMDS line unidirectionally transmits the AV stream signal from the lower (upstream) device to the upper (downstream) device, the CEC line is a bidirectional bus and bi-directionally transmits the CEC message.

Here, the device 14 (physical address: 1.2.0.0), the device 15 (physical address: 2.1.0.0), the device 16 (physical address: 2.2.0.0), the device 17 (physical address: 1.1.1.0), the device 19 (physical address: 1.1.2.1) and the device 20 (physical address: 1.1.2.2), which are at the lower ends of the respective branches of the tree, are source devices, respectively. The source device is a device having functions of reproducing, generating (hereinafter, the 'reproduction, generation' is simply referred to as 'generation') and outputting AV contents, such as DVD player, hard disk recorder, set-top box (STB), video camera, PC and the like. The AV contents are made to be stream signals, which are then transmitted through the TMDS line of the HDMI. Also, the device 11 (physical address: 1.0.0.0), the device 12 (physical address: 2.0.0.0), the device 13 (physical address: 1.1.0.0) and the device 18 (physical address: 1.1.2.0), which are on the way of the tree structure, are repeater devices. In the shown example, each of the repeater devices connects a plurality of devices at the lower layer to thus branch the tree and is referred to as a CEC switch because it has a function of switchably selecting any one HDMI input (TMDS line) of the branches. The CEC switches 11, 12 are AV amplifiers, for example, and the CEC switches 13, 18 are HDMI switching devices, for example. The source devices 14, 15, 16, 17, 19, 20 and the CEC switches 11, 12, 13, 18 are allotted with logical addresses in correspondence to functions of the respective devices, as shown in the table of FIG. 3.

In the meantime, regarding the layers of the tree, the root device 10 is at the uppermost layer. However, regarding the flow of the AV stream signal, the source devices 14, 15, 16, 17, 19, 20 are at the most upstream side and the root device (sink device) 10 is at the most downstream side.

In FIG. 2, when the sink device 10 reproduces the AV contents generated by the source device 14 (physical address: 1.2.0.0), the TMDS input of the sink device 10 is switched to the input 1 (physical address: 1.0.0.0) and the TMDS input of the CEC switch 11 is switched to the input 2 (physical address: 1.2.0.0), i.e., the source device 14. It does not care to which input the TMDS inputs of the CEC switches 12, 13, 18 are switched.

When the sink device 10 reproduces the AV contents generated by the source device 15 (physical address: 2.1.0.0), the TMDS input of the sink device 10 is switched to the input 2 (physical address: 2.0.0.0) and the TMDS input of the CEC switch 12 is switched to the input 1 (physical address: 2.1.0.0), i.e., the source device 15. It doesn't care to which input the TMDS inputs of the CEC switches 11, 13, 18 are switched. Likewise, when the sink device 10 reproduces the AV contents generated by the source device 16 (physical address: 2.2.0.0), the TMDS input of the sink device 10 is switched to the input 2 (physical address: 2.0.0.0) and the TMDS input of the CEC switch 12 is switched to the input 2 (physical address: 2.2.0.0), i.e., the source device 16. It doesn't care to which inputs the TMDS inputs of the CEC switches 11, 13, 18 are switched.

When the sink device 10 reproduces the AV contents reproduced by the source device 17 (physical address: 1.1.1.0), the TMDS input of the sink device 10 is switched to the input 1 (physical address: 1.0.0.0), the TMDS input of the CEC switch 11 is switched to the input 1 (physical address: 1.1.0.0), and the TMDS input of the CEC switch 13 is switched to the input 1 (physical address: 1.1.1.0), i.e., the source device 17. It doesn't care to which input the TMDS inputs of the CEC switches 12, 18 are switched.

When the sink device 10 reproduces the AV contents generated by the source device 19 (physical address: 1.1.2.1), the TMDS input of the sink device 10 is switched to the input 1 (physical address: 1.0.0.0), the TMDS input of the CEC switch 11 is switched to the input 1 (physical address: 1.1.0.0), the TMDS input of the CEC switch 13 is switched to the input 2 (physical address: 1.1.2.0) and the TMDS input of the CEC switch 18 is switched to the input 1 (physical address: 1.1.2.1), i.e., the source device 19. It doesn't care to which input the TMDS input of the CEC switch 12 is switched. Likewise, when the sink device 10 reproduces the AV contents generated by the source device 20 (physical address: 1.1.2.2), the TMDS input of the sink device 10 is switched to the input 1 (physical address: 1.0.0.0), the TMDS input of the CEC switch 11 is switched to the input 1 (physical address: 1.1.0.0), the TMDS input of the CEC switch 13 is switched to the input 2 (physical address: 1.1.2.0) and the TMDS input of the CEC switch 18 is switched to the input 1 (physical address: 1.1.2.2), i.e., the source device 20. It doesn't care to which input the TMDS input of the CEC switch 12 is switched.

[Configuration of HDMI Periphery]

Figure 4:
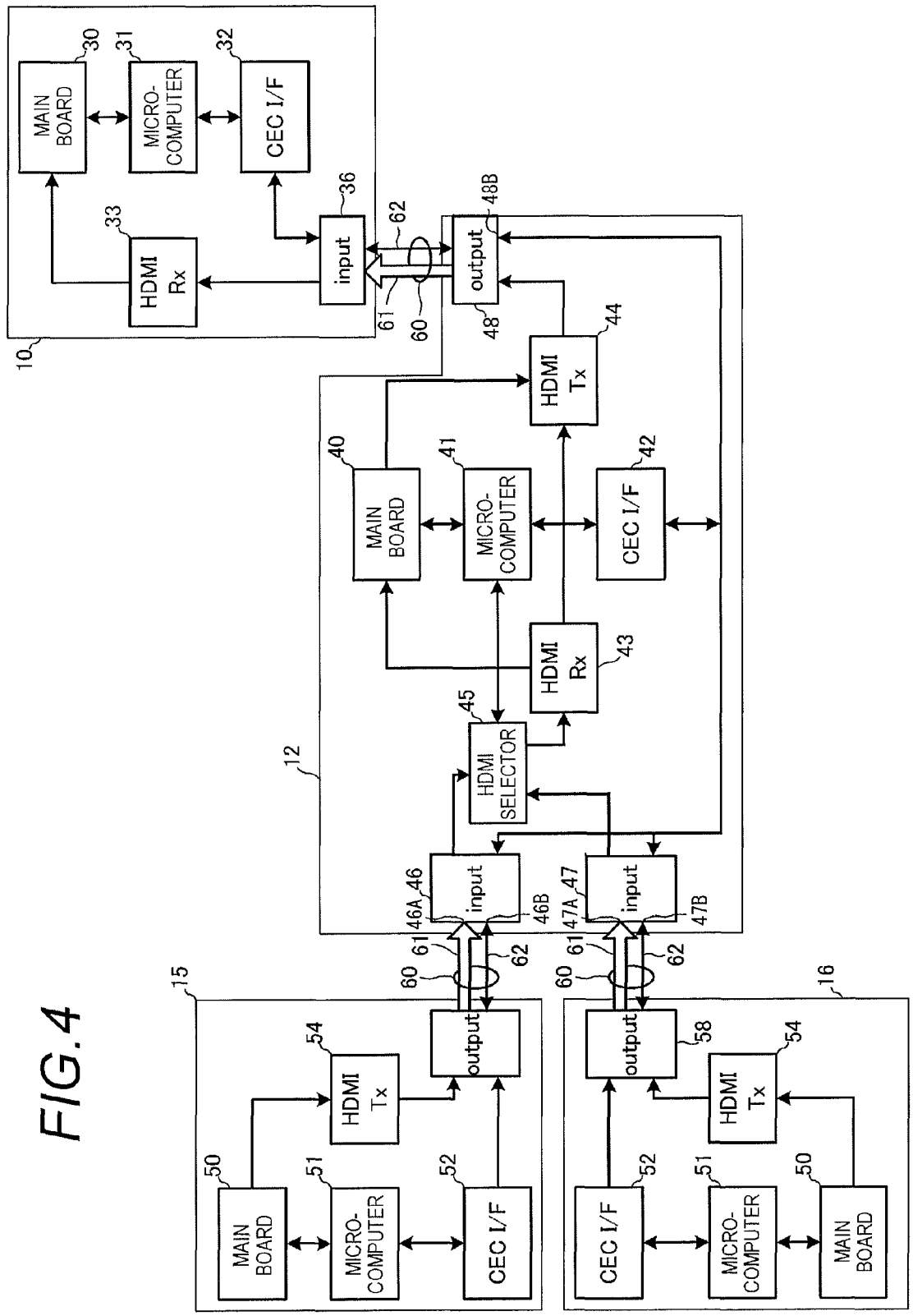
FIG. 4 is a block diagram of a part relating to an HDMI of an AV device.

FIG. 4 is a block diagram illustrating a HDMI-related configuration of each device of the AV system. In FIG. 4, for easy descriptions, only configurations of the sink device 10, the CEC switch 12 and the source devices 15, 16 are shown. Meanwhile, as described above, the source devices 15, 16 are DVD players, HDD recorders and the like having an HDMI output terminal, for example. The CEC switch 12 is an AV amplifier and the like having HDMI input and output terminals. The sink device 10 is a television receiver and the like having an HDMI input terminal.

The source device 15 has a main board 50, a microcomputer 51 for HDMI, a CEC interface 52, an HDMI transmitter 54 and an HDMI output unit 58. The main board 50 has a main CPU and generates an AV signal including a video signal and/or audio signal. For example, when the source device 15 is a DVD player, the main board reads out and decodes data recorded in a DVD and outputs the same as an AV signal. The HDMI transmitter 54 converts the AV signal input from the main board 50 into a stream signal and transmits the AV stream signal to the CEC switch 12 through the HDMI output unit 58 and a TMDS line 61 of an HDMI cable 60.

The microcomputer 51 always operates, irrespective of whether the main board 50 is on or off. A CEC interface 52 connected to the microcomputer 51 is connected to a CEC line 62 of the HDMI cable 60 through the HDMI output unit 58. The microcomputer 51 monitors a remote control receiving unit, a timer and the like in addition to the CEC interface 52, controls the on/off of the main board 50, based on the CEC message received by the CEC interface 52 or a signal input from the remote control receiving unit or timer, and notifies the main board 50 of content of the message received by the CEC interface 52 or the signal input from the remote control receiving unit or timer. Also, the microcomputer 51 edits a command, which is input from the main board 50, into a CEC message and transmits the same to the CEC line 62 through the CEC interface 52 and the HDMI output unit 58.

Although the source device 15 has been described, the source device 16 also has the same configuration and the description thereof is thus omitted.

The CEC switch 12 has a main board 40, a microcomputer 41 for HDMI, a CEC interface 42, an HDMI receiver 43, an HDMI transmitter 44, an HDMI selector 45, HDMI input units 46, 47 and an HDMI output unit 48. The HDMI selector 45 selects only TMDS terminals 46A, 47A connected to the TMDS lines 61 from inputs of the HDMI input units 46, 47. CEC terminals 46B, 47B connected to the CEC lines 62 are connected each other by the CEC interface 42 together with a CEC terminal 48B of the HDMI output unit 48, without through the HDMI selector 45.

The HDMI selector 45 inputs the AV stream signal, which is input from the selected HDMI input unit 46 or 47, to the HDMI receiver 43. The HDMI receiver 43 receives the AV stream signal, demodulates the same to an AV signal consisting of a video signal, an audio signal, a synchronous signal and the like and inputs the AV signal to the main board 40. The main board 40 processes the input AV signal. For example, when the CEC switch 12 is an AV amplifier, the main board performs processing such as equalization, lip-sync, amplification and the like for the audio signal and outputs the processed signal to a speaker. Also, the main board outputs the AV signal, as it is, to the HDMI transmitter 44. In the meantime, when the CEC switch 12 is an HDMI switching device, the main board directly transmits the AV signal from the HDMI receiver 43 to the HDMI transmitter 44. The HDMI transmitter 44 converts the input AV signal into a stream signal and transmits the AV stream signal from the HDMI output unit 48 to the sink device 10.

The microcomputer 41 always operates, irrespective of whether the main board 40 is on or off. As described above, the CEC interface 42 connected to the microcomputer 41 is connected to the CEC lines 61 of the HDMI cables 60 through the HDMI input units 46, 47 and is connected to the CEC line 62 of the HDMI cable 60 through the HDMI output unit 48. The microcomputer 41 monitors a remote control receiving unit, a timer and the like (not shown) in addition to the CEC interface 42, controls the on/off of the main board 40, based on the CEC message received by the CEC interface 42 or a signal input from the remote control receiving unit or timer, and notifies the main board 40 of content of the message received by the CEC interface 42 or the signal input from the remote control receiving unit or timer. Also, the microcomputer 41 edits a command, which is input from the main board 40, into a CEC message and transmits the same to the CEC lines 62 through the CEC interface 42, the HDMI input units 46, 47 and the HDMI output unit 48.

The sink device 10 has a main board 30, a microcomputer 31 for HDMI, a CEC interface 32, an HDMI receiver 33 and an HDMI input unit 36. In the meantime, the sink device 10 shown in FIG. 2 has a plurality of (two) HDMI input units, like the CEC switch 12, which are not shown.

The AV stream signal input from the HDMI input unit 36 is input to the HDMI receiver 33. The HDMI receiver 33 receives the AV stream signal, demodulates the same to an AV signal consisting of a video signal, an audio signal, a synchronous signal and the like and inputs the AV signal to the main board 30. The main board 30 inputs the audio signal to an audio circuit and develops the video signal into a video memory, thereby displaying the same on a display.

The microcomputer 31 always operates, irrespective of whether the main board 30 is on or off. The CEC interface 32 connected to the microcomputer 31 is connected to the CEC line 62 of the HDMI cable 60 through the HDMI input unit 36. The microcomputer 31 monitors a remote control receiving unit, a timer and the like (not shown) in addition to the CEC interface 32, controls the on/off of the main board 30, based on the CEC message received by the CEC interface 32 or a signal input from the remote control receiving unit or timer, and notifies the main board 30 of content of the message received by the CEC interface 32 or the signal input from the remote control receiving unit or timer. Also, the microcomputer 31 edits a command, which is input from the main board 30, into a CEC message and transmits the same to the CEC line 62 through the CEC interface 42 and the HDMI input unit 36.

[One-Touch Play Function]

A system control function using the CEC of the HDMI includes a one-touch play function, a remote control pass-through function and the like. The one-touch function is a function that a necessary device in a system becomes automatically on and a transmission path of the AV stream signal from a source device to the television receiver 10 becomes automatically on, in cooperation with a reproduction operation of the source device such as DVD player. That is, when a user inserts a disc into a DVD player and presses a playback button, a CEC message (Active Source message) is issued from the DVD player and the CEC switch on the branch of the tree from the DVD player to the television receiver 10 switches the input so that the above transmission path becomes effective. At the same time, a CEC message enabling a necessary operation (power on and the like) in the television receiver 10 is also issued and the contents of the DVD can be reproduced on the television receiver 10 just by the one-touch operation of the user for the DVD player.

Also, the remote control pass-through function is a function that when a user performs a remote control operation for a device (for example, television receiver 10), the user can operate a source device that is active at that time (or is recognized at that time). The television receiver 10 analyzes the received remote control signal, converts it into a CEC message and transmits the same to a source device that is currently active. A variety of commands that can be input by a television remote controller such as reproduction (playback) operation or menu operation of a playback device or recording device are converted into the CEC message. Thereby, the user can operate the source device without changing the remote controller of the television receiver 10 with a remote controller of the source device.

In the below, the one-touch play function is described with reference to the drawings.

When a user performs an operation enabling any one source device to start generation of the AV contents, the source device starts to reproduce the AV contents and to transmit the AV stream signal toward the television receiver 10 (logical address: 0). At this time, the source device broadcasts an Active Source message <Active Source> [A.B.C.D] in which the physical address (A.B.C.D) thereof is attached to an argument. In the meantime, the broadcast is to issue a CEC message having a destination that is all devices connected by the HDMI. Thereby, the CEC switch positioned between the television receiver 10 and the source device (A.B.C.D) switches the input so that the transmission path of the AV stream signal between the television receiver 10 and the source device becomes active.

Figure 5:
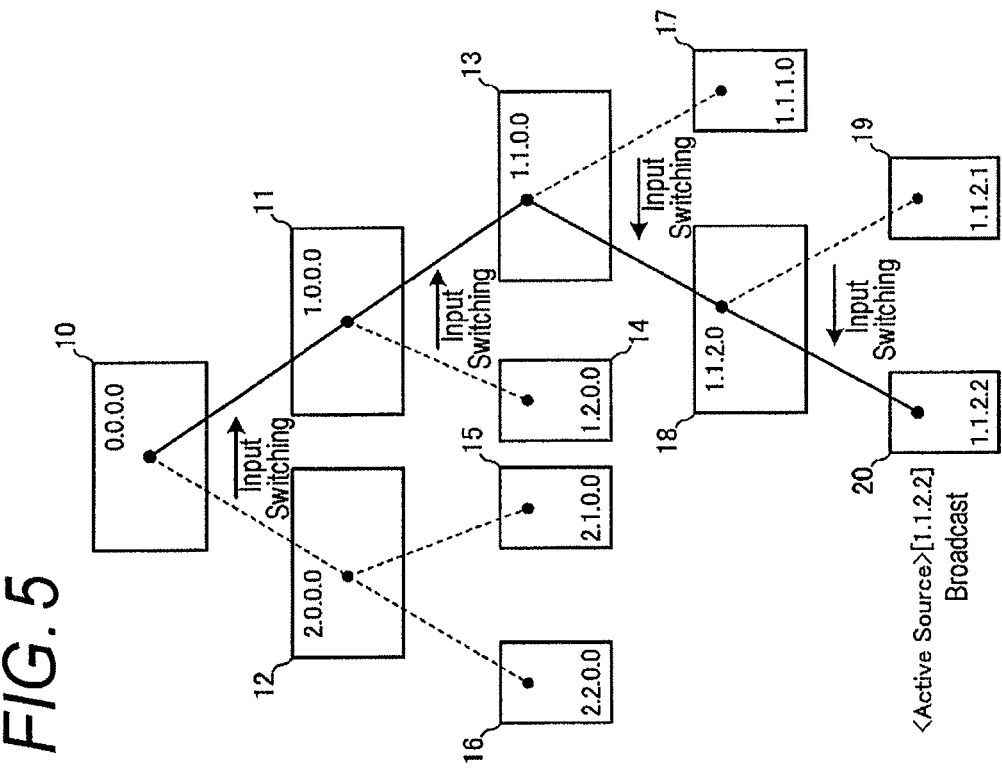
FIG. 5 illustrates switching of a TMDS line when an Active source message is broadcasted.

For example, as shown in FIG. 5, when <Active Source> [1.1.2.2] is broadcasted from the source device 20 (physical address: 1.1.2.2), the CEC switch 18 (physical address: 1.1.2.0) switches the input to the input 2 (physical address: 1.1.2.2), the CEC switch 13 (physical address:1.1.0.0) switches the input to the input 2 (physical address: 1.1.2.0), the CEC switch 11 (physical address:1.0.0.0) switches the input to the input 1 (physical address: 1.1.0.0) and the television receiver 10 (physical address: 0.0.0.0) switches the input to the input 1 (physical address: 1.0.0.0). Here, the 'switching' includes a case where when an input of a switching destination is originally selected, the selected state is held. Thereby, the transmission path of the AV stream signal from the source device 20 (physical address: 1.1.2.2) to the television receiver 10 (logical address: 0, physical address: 0.0.0.0) becomes active.

At the same time, the information that the source device, which is currently under reproduction (which is active), is the source device 20 is stored in the television receiver 10 that is a sink device having the logical address 0. Thereby, a message of the remote control pass-through, which is issued by the television receiver 10 as the remote control code is input to the television receiver 10, is transmitted from the television receiver 10 to the source device 20 that is a destination.

In the meantime, the issuance of the Active Source message is not limited to the configuration in which the issuance is based on the operation of the user. For example, the message may be issued, based on activation by the timer, and the like.

On the other hand, when it is intended to make the transmission path of the AV stream signal active from the television receiver 10 to a designated specific source device, a <Set Stream Path> [A.B.C.D] message in which the physical address of a device to be designated is attached to an argument is broadcasted. Thereby, the CEC switch positioned between the television receiver 10 and the designated source device switches the input so that the transmission path of the AV stream signal between the television receiver 10 and the source device designated with the physical address becomes active.

Figure 6:
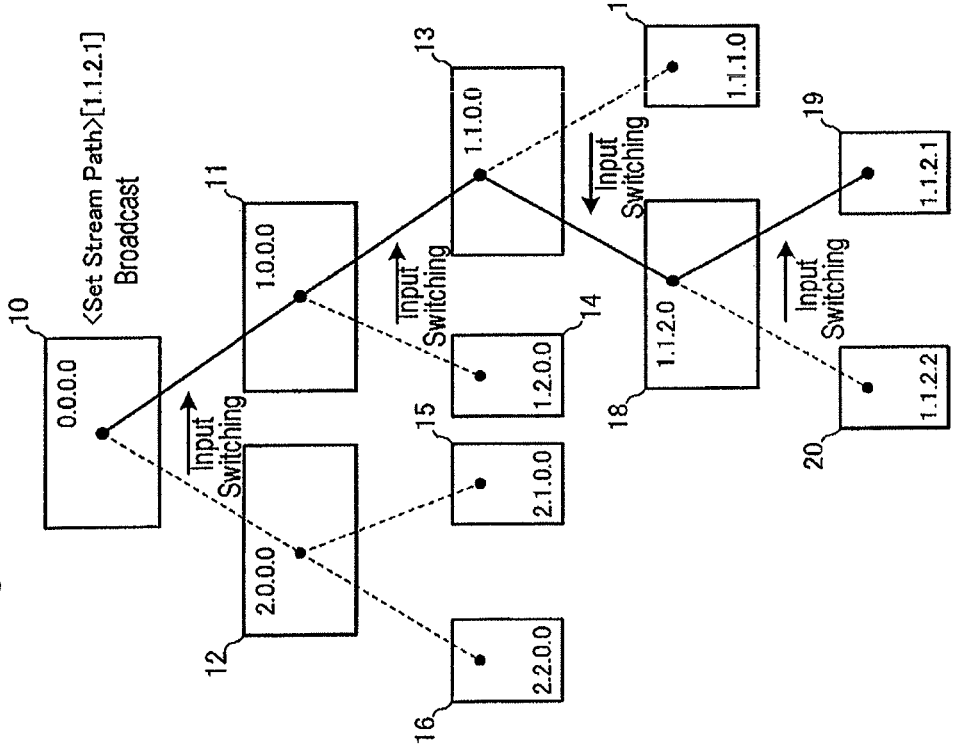
FIG. 6 illustrates switching of the TMDS line when a Set Stream Path message is broadcasted.

FIG. 6 shows a switching aspect of the TMDS line when <Set Stream Path> [1.1.2.1], which is a message for making the transmission path of the AV stream signal active from the television receiver 10 (physical address: 0.0.0.0) to the source device 19 (physical address: 1.1.2.1), is broadcasted. In this case, the CEC switch 11 (physical address: 1.0.0.0) switches the input to the input 1 (physical address: 1.1.0.0), the CEC switch 13 (physical address: 1.1.0.0) switches the input to the input 2 (physical address: 1.1.2.0) and the CEC switch 18 (physical address: 1.1.2.0) switches the input to the input 2 (physical address: 1.1.2.1). In the meantime, the television receiver 10 switches the input to the input 1 (physical address: 1.0.0.0) by internal control, irrespective of the CEC message. Here, the 'switching' includes a case where when an input of a switching destination is originally selected, the selected state is held. Thereby, the transmission path of the AV stream signal from the television receiver 10 (physical address: 0.0.0.0) to the source device 19 (physical address: 1.1.2.1) becomes active.

In the meantime, the device (source device 19, in the example of FIG. 6) positioned at the designated physical address broadcasts an <Active Source> message when the device is under state at which it can stably output the AV stream signal.

Thereby, the information that the source device, which is currently active, is the source device 19 is stored in the television receiver 10, and the remote control pass-through message thereafter is transmitted to the source device 19 that is a destination.

Also, when the CEC switch is directly operated by the user and the input of the HDMI is switched, a Routing Change message is issued. The Routing Change message broadcasts <Routing Change> [switching origin physical address] [switching destination physical address] in which the physical address of the HDMI input unit of a switching origin and the physical address of the HDMI input unit of a switching destination are arguments. For example, as shown in FIG. 7, when the CEC switch 11 (physical address: 1.0.0.0) switches the input from the input 1 (physical address: 1.1.0.0) to the input 2 (physical address: 1.2.0.0), <Routing Change> [1.1.0.0] [1.2.0.0] is broadcasted.

Figure 7:
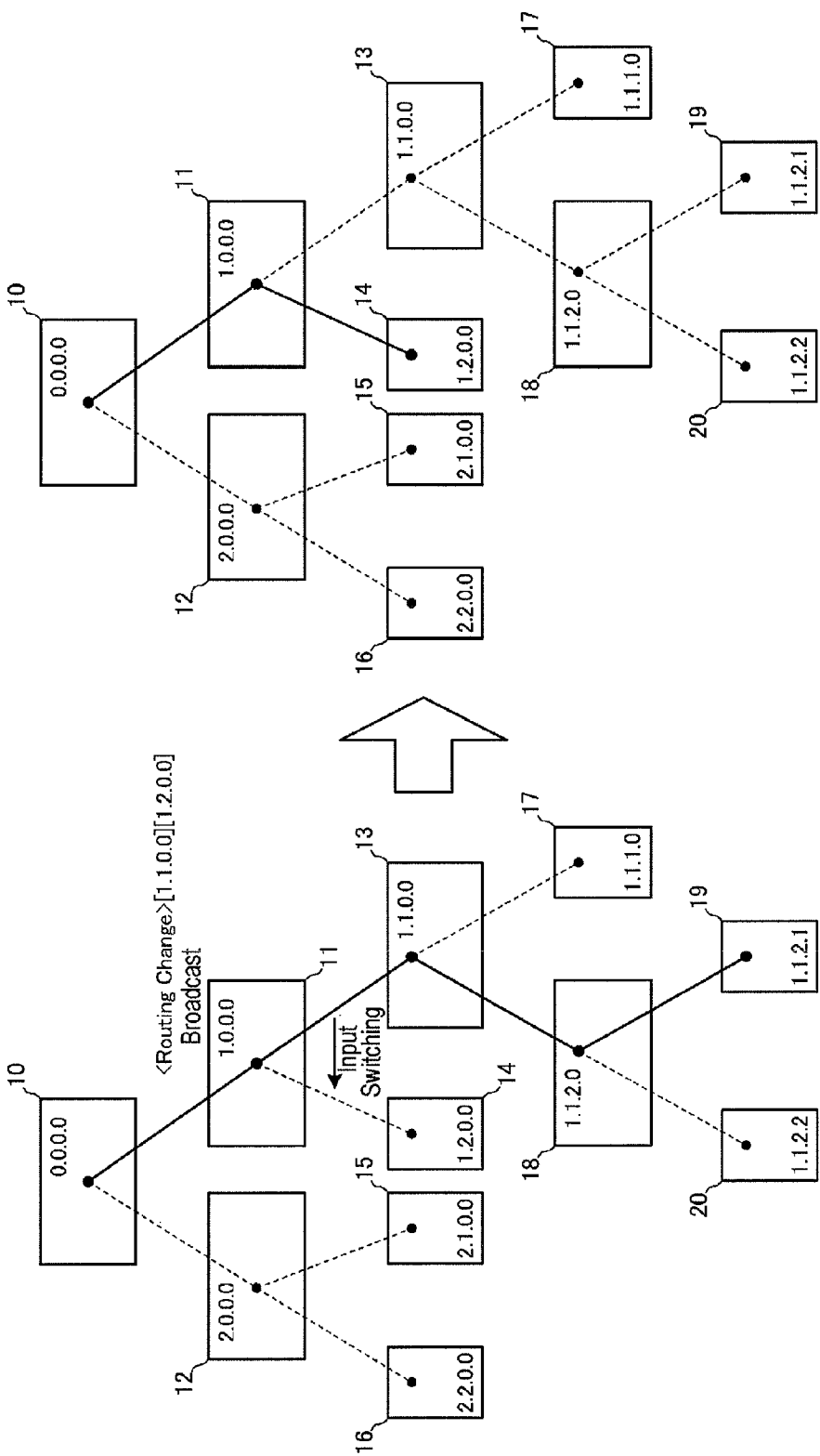
FIG. 7 illustrates switching of the TMDS line when a Route Changing message is broadcasted.

After the switching as shown in FIG. 7, when the CEC switch 11 (physical address: 1.0.0.0) switches the input from the input 2 (physical address: 1.2.0.0) to the input 1 (physical address: 1.1.0.0), <Routing Change> [1.2.0.0] [1.1.0.0] is broadcasted. By the second switching, the path from the CEC switch 13 to the source device 19, which have been deviated from the active path due to the first switching, is again included in the active transmission path of the AV stream signal.

As the Routing Change message is issued, the active source device is also switched. In the example of FIG. 7, the active device is switched from the source device 19 to the source device 14. Thereby, the destination of the remote control pass-through message issued from the television receiver 10 having the logical address 0 is also switched from 1.1.2.1 to 1.2.0.0.

[Input Position Holding Mode]

In the AV system connected by the HDMI having the one-touch play function, when a user is watching the specific AV contents on the television receiver 10, the transmission path of the AV stream signal to the television receiver 10 may be switched due to the CEC message issued by the other source device. For example, there are a case where the HDD recorder starts for recording and outputs an Active Source message while the user is watching the television broadcasting and a case where the STB (Set-Top Box) starts for acquisition of an EPG (Electronic Program Guide) and outputs an Active Source message while the user is watching the recorded contents of the HDD recorder.

In the AV system of this embodiment, in order to prevent the useless switching of the TMDS line, an input position holding mode that is a mode in which the TMDS line is not switched can be set (or activated) in each device by the CEC message (hereinafter, also referred to as a switching request message) for requesting the switching of the transmission path of the AV stream signal from an origin position to a destination position, as described above. In the below, the input position holding mode is described.

When the user selects the AV contents that the user wants to watch and designates the root device thereof to thus make the transmission path of the AV stream signal from the source device to the television receiver 10 active, the input position holding mode is activated for the CEC switch of the AV system. The input position holding mode is preferably activated by the direct operation for the CEC switch. Also, as described below, the input position holding mode may be activated by using a specific message using the CEC line. When the input position holding mode is activated, even if a switching request message is issued from any one device, each CEC switch ignores the corresponding message and does not switch the TMDS line (does hold the TMDS line, in other words).

However, when a switching request message such as Active Source message and Set Stream Path message is broadcasted-issued, each device on the system recognizes that the source device, which is active for the television receiver 10, is switched by the message. If the state is left as it is, a message designating a specific device, for example a source device of contents that are currently reproduced on the TV receiver 10, such as remote control pass-through message, is issued to the device that is recognized to be active by the switching request message and is a destination, and the switching request message is ignored, so that the message may be delivered to a device different from the device for which the transmission path of the AV stream signal is held.

Thus, when the CEC switch for which the input position holding mode is activated becomes a switching target by the switching request message, a CEC message (hereinafter, referred to as a reverse message) having content that negates the CEC message (returns the transmission path of the AV stream signal to the origin from the destination) is broadcasted-issued. By the reverse message, the active transmission path (active source device) of the AV stream signal, which is recognized by each device, is made to match with the transmission path of the AV stream signal, which ignores the input switching request message and is held at the active state.

Here, the reverse message may be a Routing Change message that has, as the switching origin, the physical address of the input to be connected by the ignored switching request message, and has, as the switching destination, the physical address of the input being held.

In the meantime, when the user watches the television broadcasting by using a tuner embedded in the television receiver 10, the television receiver 10 itself is the source device.

Figure 8A:
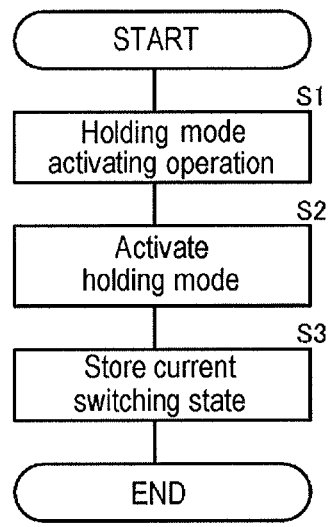
FIGS. 8A to 8C are flowcharts showing operations relating to an input position holding mode of a CEC switch.
Figure 8B:
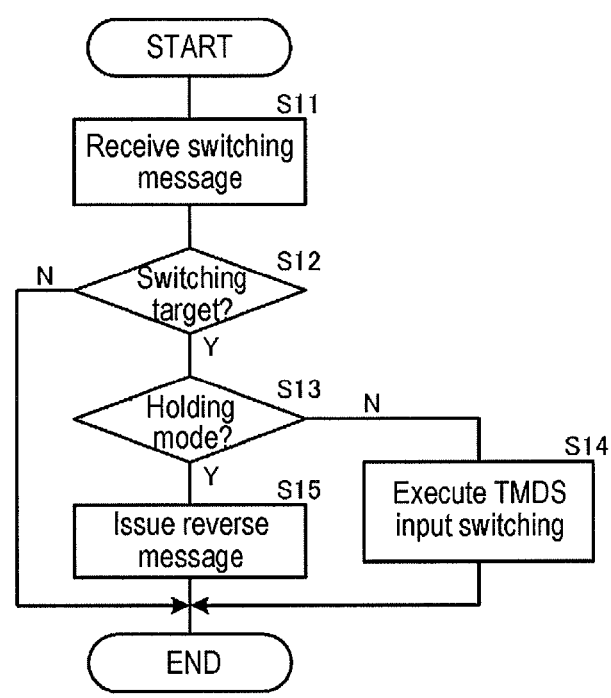
Figure 8C:
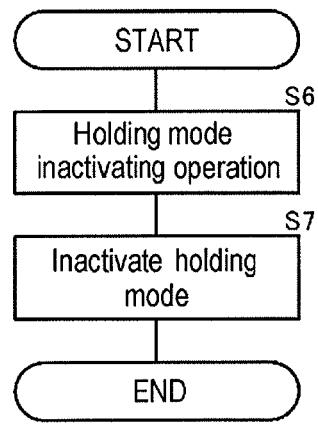

FIGS. 8A to 8C are flowcharts showing operations relating to the input position holding mode of the CEC switch.

FIG. 8A is a flowchart showing an operation of the CEC switch when an operation of activating the input position holding mode is performed.

When an operation of activating the input position holding mode is performed (S1), the CEC switch activates the input position holding mode (S2). For example, the CEC switch activates an input position holding mode flag. Then, the CEC switch stores a current input switching state (S3). The operation may be preferably performed by the microcomputer for HDMI.

FIG. 8B is a flowchart showing an operation of the CEC switch when the switching request message is input. When the switching request message is received (S11), the CEC switch determines whether the own device is a switching target (S12). The description that the own device is a switching target means that it is necessary to switch an input of the own device so as to make the transmission path of the AV stream signal, which the switching request message requests, active. When the own device is not a switching target (NO in S12), the CEC switch ends the operation. When the own device is a switching device (YES in S12), the CEC switch determines whether the input position holding mode is currently activated (S13). This determination may be made by determining whether the input position holding mode flag is activated. When the input position holding mode is not activated (NO in S13), the CEC switch switches the input (TMDS line) of the HDMI in accordance with an instruction of the switching request message (S14). Then, the CEC switch ends the operation. When the input position holding mode is activated (YES in S13), the CEC switch broadcast-issues a reverse message negating the switching request message (15). Then, the CEC switch ends the operation. The operation of this flowchart may be preferably performed under control of the CPU of the main board 40.

FIG. 8C is a flowchart showing an operation of the CEC switch when an operation of inactivating the input position holding mode is performed. When an operation of inactivating the input position holding mode is performed (S6), the CEC switch inactivates the input position holding mode (S7). This processing is to inactivate the input position holding mode flag, for example.

In the meantime, the CEC switch that activates the input position holding mode may be a CEC switch that is a part of the system or all CEC switches.

In the below, a case is described in which the input position holding mode is activated for the CEC switch 13 (physical address: 1.1.0.0) in the AV system having the configuration of FIG. 2, with reference to FIGS. 9 to 12.

Figure 10:
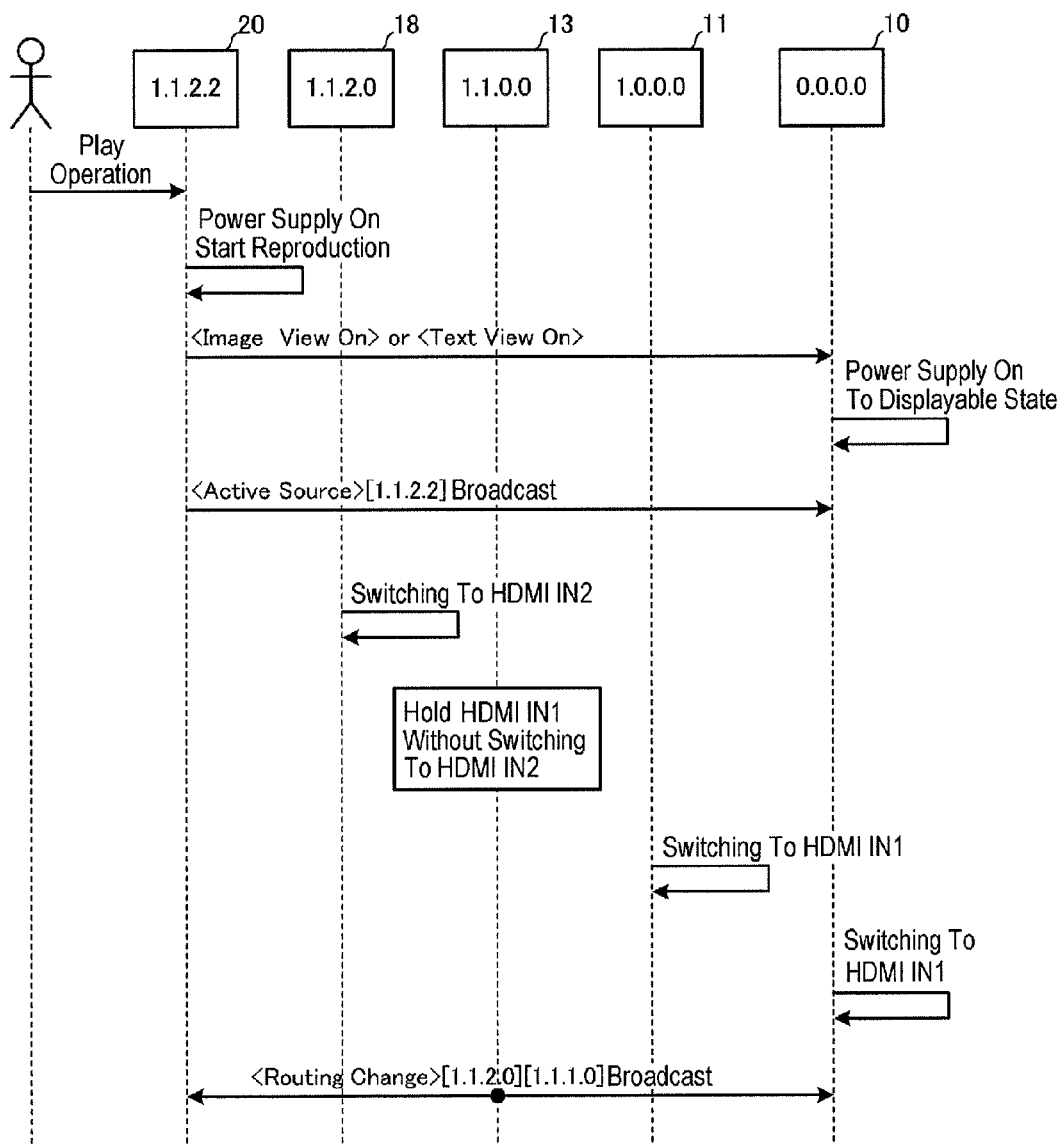
FIG. 10 shows a sequence when the Active source message is broadcasted in another aspect of the input position holding mode.

FIGS. 9 and 10 show a case where an Active Source message is issued from the source device 20 (physical address: 1.1.2.2) at a state in which the source device 17 (physical address: 1.1.1.0) is active and the input position holding mode is activated for the CEC switch 13 (physical address: 1.1.0.0).

The source device 20 starts an operation and thus <Active Source (1.1.2.2)>, which is a message of the one-touch play, is broadcasted. A device on a path connecting the source device 20 and the television receiver 10 is a device of the switching target. In order to make the path active, the CEC switch 18 (physical address: 1.1.2.0) switches the input to the input 2 (physical address: 1.1.2.2). In order to make the path active, the CEC switch 11 (physical address: 1.0.0.0) switches the input to the input 1 (physical address: 1.1.0.0). Also, in order to make the path active, the television receiver 10 (physical address: 0.0.0.0) switches the input to the input 1 (physical address: 1.0.0.0). In the meantime, the CEC switch 13 has the input fixed to the input 1 (physical address: 1.1.1.0) and does not switch the input because the input position holding mode is applied thereto.

At this state, the source device that the TV receiver 10 recognizes as the active source device (the most upstream device of the active transmission path of the AV stream signal) on the CEC is the source device 20 (physical address: 1.1.2.2). However, since the CEC switch 13 does not switch the input, the image (voice) that is actually reproduced on the TV receiver 10 belongs to the source device 17 (physical address: 1.1.1.0). If this goes on, the operating target of the remote control pass-through function from the TV receiver 10 becomes the source device 20, and the source device that continues to reproduce on the TMDS path and the source device that is the operating target by the CEC are not matched, i.e., reproduction/operating targets are not matched.

Therefore, the CEC switch 13 for which the input position holding mode is activated broadcasts <Routing Change> [1.1.2.0] [1.1.1.0]. Thereby, the active source device that is recognized by the devices on the system including the TV receiver 10 is returned to the source device 17. Thereby, the mismatch of the reproduction/operating targets is solved. In the meantime, since just a little time is required until the CEC switch 13 broadcasts <Routing Change> [1.1.2.0] [1.1.1.0] after the source device 20 broadcasts <Active Source> [1.1.2.2], the mismatch of the reproduction/operating targets does not substantially occur.

Figure 11:
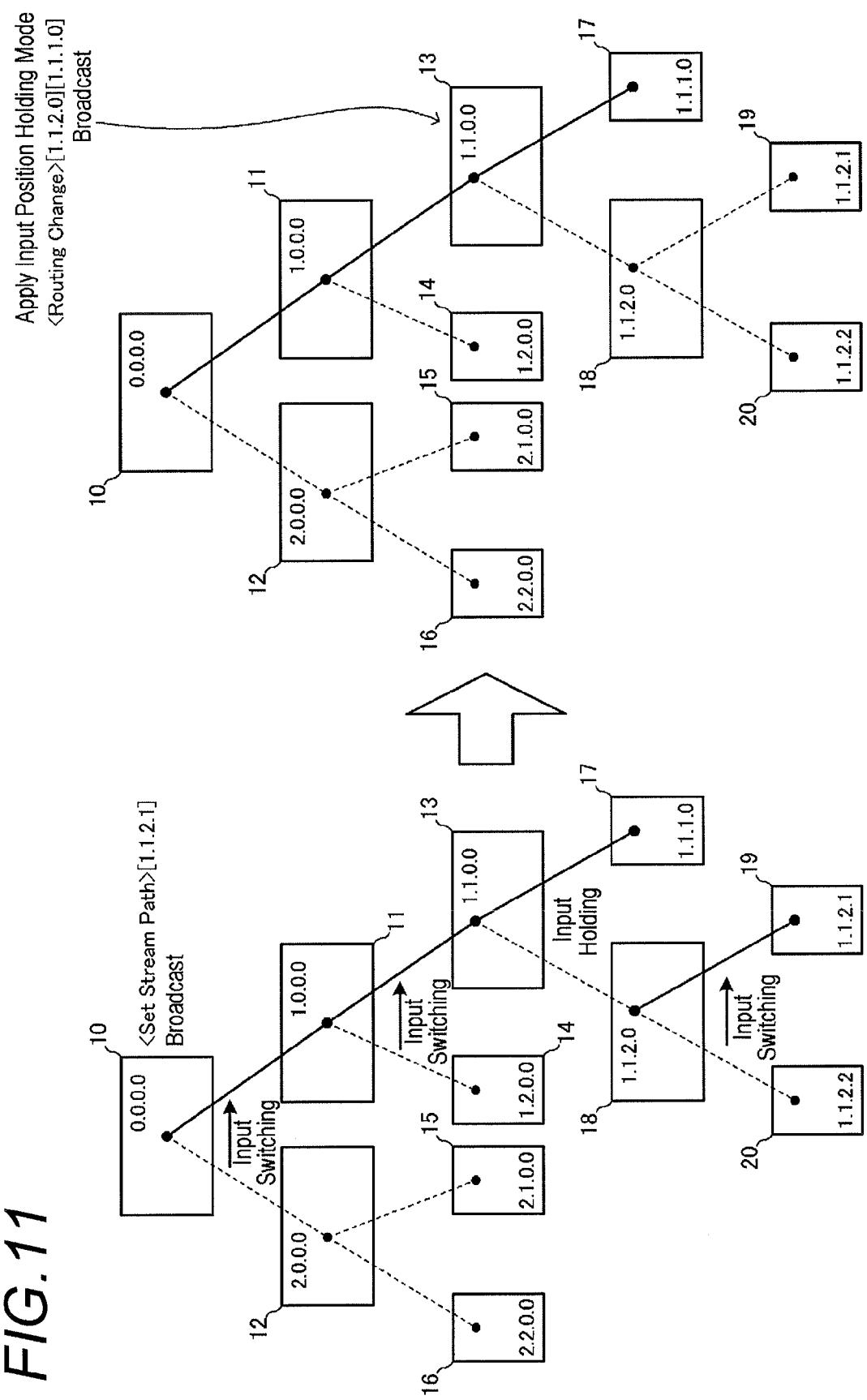
FIG. 11 illustrates switching of the TMDS line when a Set Stream Path message is broadcasted in another aspect of the input position holding mode.
Figure 12:
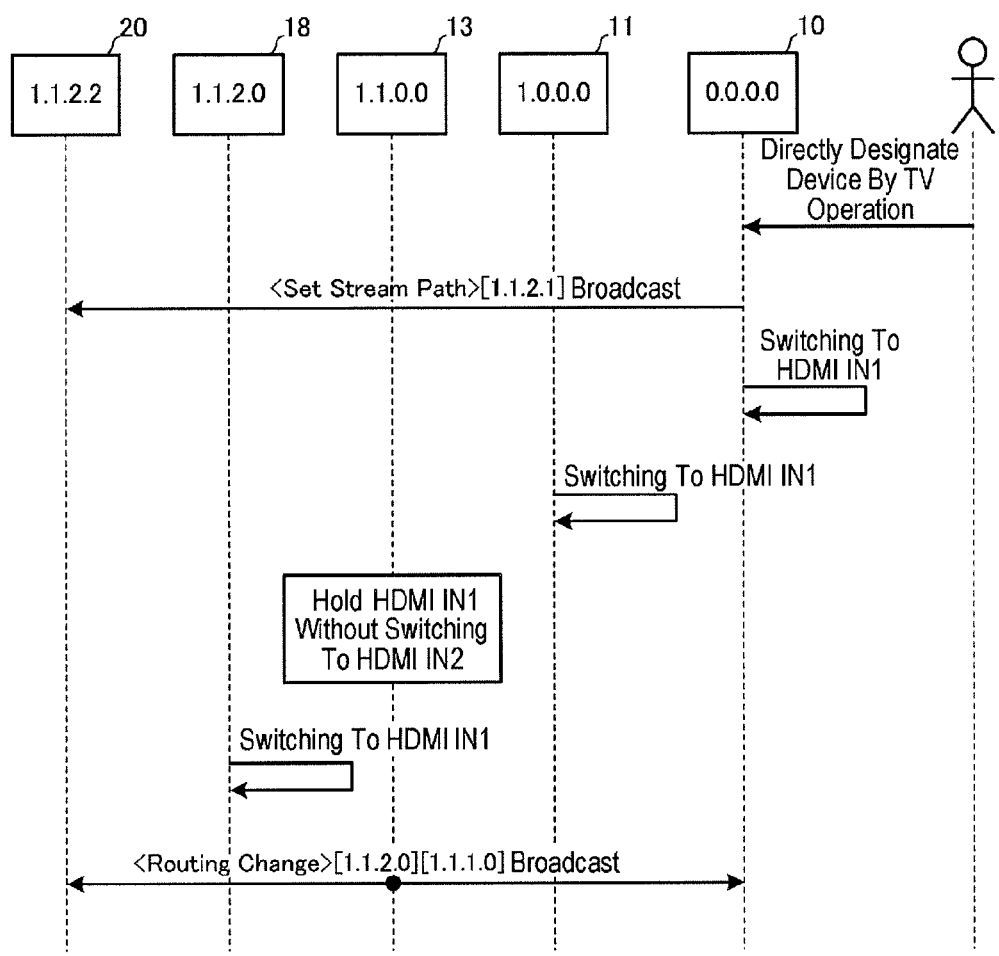
FIG. 12 shows a sequence when the Set Stream Path message is broadcasted in another aspect of the input position holding mode.

FIGS. 11 and 12 show a case where a Set Stream Path message is issued from the television receiver 10 (physical address: 0.0.0.0) at a state in which the source device 17 (physical address: 1.1.1.0) is active and the input position holding mode is activated for the CEC switch 13 (physical address: 1.1.0.0). That is, the input position holding mode can be applied even when the switching request message is broadcasted from the TV receiver 10.

When the TV receiver 10 intends to display the contents of the source device 19 (physical address: 1.1.2.1), the TV receiver 10 switches the input to the input 1 (physical address: 1.0.0.0) and broadcasts <Set Stream Path> [1.1.2.1]. A device on the transmission path of the AV stream signal, which connects the source device 19 and the television receiver 10, is the device of the switching target. In order to make the path active, the CEC switch 11 (physical address: 1.0.0.0) switches the input to the input 1 (physical address: 1.1.0.0). In order to make the path active, the CEC switch 18 (physical address: 1.1.2.0) switches the input to the input 1 (physical address: 1.1.2.1). In the meantime, the CEC switch 13 has the input fixed to the input 1 (physical address: 1.1.1.0) and does not switch the input because the input position holding mode is applied thereto.

At this state, the source device that the TV receiver 10 recognizes as the active source device on the CEC is the source device 19 (physical address: 1.1.2.1). However, since the CEC switch 13 does not switch the input, the image (voice) that is actually reproduced on the TV receiver 10 belongs to the source device 17 (physical address: 1.1.1.0). If this goes on, the operating target of the remote control pass-through function from the TV receiver 10 becomes the source device 19, and the reproduction/operating targets are not matched.

Therefore, the CEC switch 13 for which the input position holding mode is activated broadcasts <Routing Change> [1.1.2.0] [1.1.1.0]. Thereby, the active source device that is recognized by the devices on the system including the TV receiver 10 is returned to the source device 17. Thereby, the mismatch of the reproduction/operating targets is solved. In the meantime, since just a little time is required until the CEC switch 13 broadcasts <Routing Change> [1.1.2.0] [1.1.1.0] after the TV receiver 10 broadcasts <Set Stream Path> [1.1.2.1], the mismatch of the reproduction/operating targets does not substantially occur.

[Provisos]

In the meantime, the general AV amplifier has the HDMI input unit and is classified into the repeater device. However, the AV amplifier may HDMI-output, as the AV stream signal, reception voice of an embedded radio tuner, an audio signal of an analog input and the like. In this case, a device that has a GUI and can output an image may operate as a source device. When the input position holding mode is activated so as to enable the AV amplifier to function as the source device, i.e., to reproduce the AV stream signal generated by the AV amplifier on the television receiver 10, the AV amplifier broadcasts, as a reverse message for the switching request message broadcast from the other device, an Active Source message having the physical address of the own device as a parameter, other than a Routing Change message.

In the above embodiment, while the input position holding mode is activated, the Set Stream Path message generated by the television receiver 10 is also ignored. However, the Set Stream Path message, which is issued as the user operates the television receiver 10, may be made to be effective and thus the transmission path of the AV stream signal may be switched. The input position holding mode may be automatically inactivated by the Set Stream Path message, and the input position holding mode may be continued for the path (source device) that is made to be active by the Set Stream Path message and that is a holding target.

[Modified Embodiments]

In the above embodiment, each device is directly operated to thus activate/inactivate the input position holding mode. The activating/inactivating of the input position holding mode may be collectively made on the entire system by a message using the CEC line. In the below, the modified embodiments are described.

When the user selects the AV contents that the user wants to watch and designates the root device thereof to thus make the transmission path of the AV stream signal from the source device to the television receiver 10 active, the input position holding mode is activated for all devices of the AV system. The input position holding mode is preferably activated using the CEC message. When the input position holding mode is activated, even if a switching request message is issued from any one device, each CEC switch ignores the message and does not switch the TMDS line.

Figure 13A:
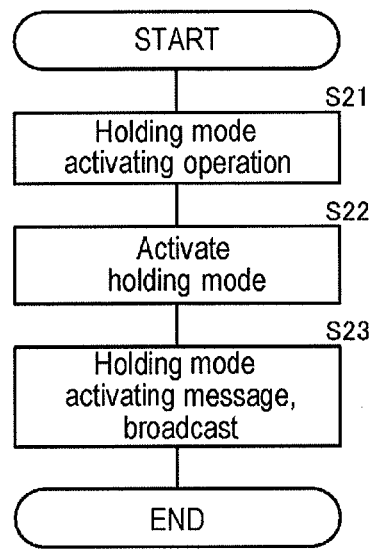
FIGS. 13A to 13D are flowcharts showing operations relating to activating/inactivating of the input position holding mode of each device of the AV system.

FIG. 13A is a flowchart showing an operation of the television receiver 10 when an operation of activating the input position holding mode is performed for the television receiver 10. When an operation of activating the input position holding mode is performed by the user (S21), the television receiver activates the input position holding mode for its own device (S22). For example, the television receiver activates an input position holding mode flag. Then, the television receiver broadcasts a CEC message activating the input position holding mode (S23). In the meantime, the operation of activating the input position holding mode (activating the flag) in S22 may be preferably performed by the microcomputer 31 for HDMI and the operations of S21 and S23 may be preferably performed by the CPU of the main board 30.

Figure 13B:
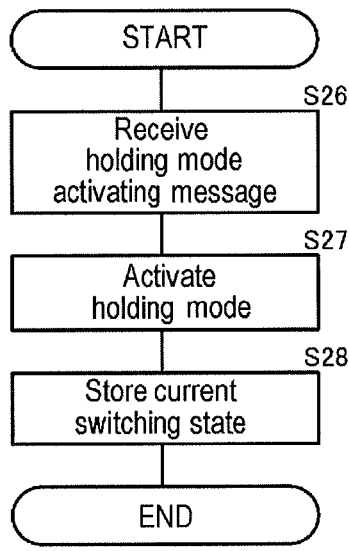

FIG. 13B is a flowchart showing an operation of each device when the CEC message activating the input position holding mode is received. When the CEC message activating the input position holding mode is received (S26), the device activates the input position holding mode for its own device (S27). For example, the device activates the input position holding mode flag. Then, the device stores a current input switching state (S28). The operation may be preferably performed by the microcomputer for HDMI. By the processing of FIGS. 13A and 13B, the input position holding mode is activated for the entire AV system.

Figure 13C:
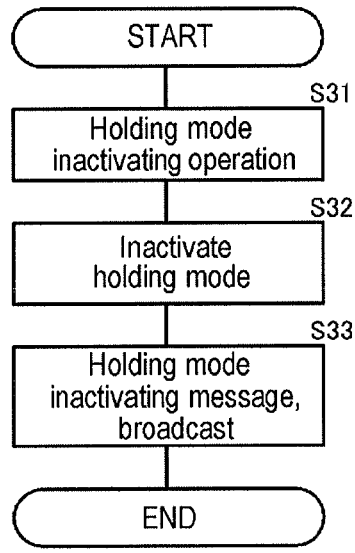

FIG. 13C is a flowchart showing an operation of the television receiver 10 when an operation of inactivating the input position holding mode is performed for the television receiver 10. When an operation of inactivating the input position holding mode is performed by the user (S31), the television receiver inactivates the input position holding mode of its own device (S32). This processing is to inactivate the input position holding mode flag, for example. Then, the television receiver broadcasts a CEC message inactivating the input position holding mode (S33).

Figure 13D:
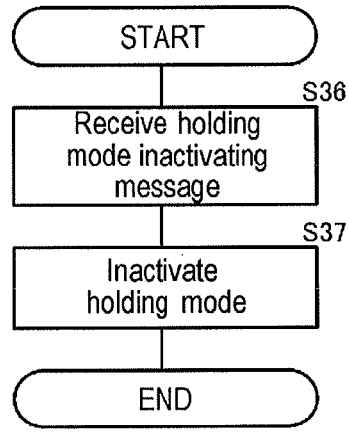

FIG. 13D is a flowchart showing an operation of each device when the CEC message inactivating the input position holding mode is received. When the CEC message inactivating the input position holding mode is received (S36), the device inactivates the input position holding mode of its own device (S37). This processing is to inactivate the input position holding mode flag, for example. By the processing of FIGS. 13C and 13D, the input position holding mode of the AV system is inactivated.

In the meantime, the device for which the user activates/inactivates the input position holding mode is not limited to the television receiver 10. Also, the means of notifying the entire system of the input position holding mode is not limited to the CEC message.

Also, a message that activates the input position holding mode for each deice (CEC switch) may be provided in addition to the message activating the input position holding mode for the entire system.

What is claimed is:

1. An input switching apparatus of an audio/video signal, the apparatus comprising:
    a plurality of audio/video signal input units to which audio/video signals are input;
    a communication unit that communicates with another audio/video device;
    an input selection unit that selects one of the plurality of audio/video signal input units to thus receive the audio/video signal of the selected audio/video signal input unit; and
    a selection control unit that switches selection of the input selection unit in accordance with a switching request message for requesting switching of the input selection unit from an origin position to a destination position when the communication unit receives the switching request message, wherein
    the selection control unit is configured to transmit a message for directing another device to perform a switching from the destination position to the origin position through the communication unit even when the communication unit receives the switching request message from said another audio/video device for requesting switching of the input selection unit from the origin position to the destination position,
    the selection control unit is configured to activate and inactivate an input position holding mode,
    while the input position holding mode is inactivated, the selection control unit performs switching of the input selection unit when the communication unit receives the switching request message for requesting switching of the input selection unit from the origin position to the destination position, and
    while the input position holding mode is activated, the selection control unit transmits the message for directing another device to perform the switching from the destination position to the origin position through the communication unit even when the communication unit receives the switching request message from said another audio/video device for requesting switching of the input selection unit from the origin position to the destination position.

2. The input switching apparatus according to claim 1, wherein
    the audio/video signal input unit includes a processing unit that receives and processes a TMDS (Transition Minimized Differential Signaling) packet of an HDMI (High-Definition Multimedia Interface), and
    the communication unit includes a processing unit having a CEC (Consumer Electronics Control) interface of the HDMI.

3. The input switching apparatus according to claim 1, wherein
    the selection control unit activates the input position holding mode in accordance with an input position holding mode activating message received from the communication unit.

4. An audio/video system in which a sink device, a repeater device having the input switching apparatus as defined in claim 3 and a plurality of source devices are connected in a tree topology, the sink device serving as a root device of the tree topology, wherein
    at least the sink device among the sink device, the repeater device and the source devices issues the input position holding mode activating message.

5. The audio/video system according to claim 4, wherein the sink device includes a television receiver.

6. An input switching apparatus of an audio/video signal, the apparatus comprising:
    an audio/video signal input unit to which an audio/video signal is input from an outside source;
    an audio/video signal generation unit that generates an audio/video signal;
    a communication unit that communicates with another audio/video device;
    an input selection unit that selects one of the audio/video signal input unit and the audio/video signal generation unit to thus receive the audio/video signal of the selected one; and
    a selection control unit that switches selection of the input selection unit in accordance with a switching request message for requesting switching of the input selection unit from an origin position to a destination position when the communication unit receives a switching request message, wherein,
    while an input position holding mode is activated, the selection control unit is configured to transmit a message for directing another device to perform a switching from the destination position to the origin position through the communication unit even when the communication unit receives the switching request message from said another audio/video device for requesting switching of the input selection unit from the origin position to the destination position,
    the selection control unit is configured to activate and inactivate an input position holding mode,
    while the input position holding mode is inactivated, the selection control unit performs switching of the input selection unit when the communication unit receives the switching request message for requesting switching of the input selection unit from the origin position to the destination position, and
    while the input position holding mode is activated, the selection control unit transmits the message for directing another device to perform the switching from the destination position to the origin position through the communication unit even when the communication unit receives the switching request message from said another audio/video device for requesting switching of the input selection unit from the origin position to the destination position.

7. The input switching apparatus according to claim 6, wherein
the audio/video signal input unit includes a processing unit that receives and processes a TMDS (Transition Minimized Differential Signaling) packet of an HDMI (High-Definition Multimedia Interface), and
the communication unit includes a processing unit having a CEC (Consumer Electronics Control) interface of the HDMI.

8. The input switching apparatus according to claim 6, wherein
the selection control unit activates the input position holding mode in accordance with an input position holding mode activating message received from the communication unit.

9. An audio/video system in which a sink device, a repeater device having the input switching apparatus as defined in claim 8 and a plurality of source devices are connected in a tree topology, the sink device serving as a root device of the tree topology, wherein
at least the sink device among the sink device, the repeater device and the source devices issues the input position holding mode activating message.

10. The audio/video system according to claim 9, wherein the sink device includes a television receiver.

11. An input switching method of an audio/video signal that is executed in an apparatus comprising a plurality of audio/video signal input units to which audio/video signals are input, a communication unit that communicates with another audio/video device and an input selection unit that selects one of the plurality of audio/video signal input units to thus receive the audio/video signal of the selected audio/video signal input unit, the method comprising:
switching selection of the input selection unit in accordance with a switching request message from an origin position to a destination position received through the communication unit; and
while an input position holding mode is activated, transmitting a message for causing another device to perform a switching from the destination position to the origin position through the communication unit even when the switching request message from said another audio/video device for requesting switching of the input selection unit from the origin position to the destination position is received,
activating and inactivating an input position holding mode, wherein
while the input position holding mode is inactivated, switching of the input selection unit is performed when the switching request message for requesting switching from the origin position to the destination position is received, and
while the input position holding mode is activated, the message for directing another device to perform the switching from the destination position to the origin position is transmitted through the communication unit even when the switching request message from said another audio/video device for requesting switching of the input selection unit from the origin position to the destination position is received.

12. The input switching method according to claim 11, wherein
the audio/video signal input unit includes a processing unit that receives and processes a TMDS (Transition Minimized Differential Signaling) packet of an HDMI (High-Definition Multimedia Interface), and
the communication unit includes a processing unit having a CEC (Consumer Electronics Control) interface of the HDMI.

13. An input switching method of an audio/video signal that is executed in an apparatus comprising an audio/video signal input unit to which an audio/video signal is input from an outside source, an audio/video signal generation unit that generates an audio/video signal, a communication unit that communicates with another audio/video device and an input selection unit that selects one of the audio/video signal input unit and the audio/video signal generation unit to thus received the audio/video signal of the selected one, the method comprising:
switching selection of the input selection unit in accordance with a switching request message from an origin position to a destination position received through the communication unit; and
while an input position holding mode is activated, transmitting a message for directing another device to perform a switching from the destination position to the origin position through the communication unit even when the switching request message from said another audio/video device for requesting switching of the input selection unit from the origin position to the destination position is received,
activating and inactivating an input position holding mode, wherein
while the input position holding mode is inactivated, switching of the input selection unit is performed when the switching request message for requesting switching from the origin position to the destination position is received, and
while the input position holding mode is activated, the message for directing another device to perform the switching from the destination position to the origin position is transmitted through the communication unit even when the switching request message from said another audio/video device for requesting switching of the input selection unit from the origin position to the destination position is received.

14. The input switching method according to claim 13, wherein
the audio/video signal input unit includes a processing unit that receives and processes a TMDS (Transition Minimized Differential Signaling) packet of an HDMI (High-Definition Multimedia Interface), and
the communication unit includes a processing unit having a CEC (Consumer electronics Control) interface of the HDMI.

* * * * *